United States Patent [19]

Spencer et al.

[11] 4,271,011
[45] Jun. 2, 1981

[54] FLOUR SIFTER

[76] Inventors: Patricia J. Spencer, 805 Valley View Rd., Ft. Collins, Colo. 80524; Carrie P. DeRoeck; Robert L. DeRoeck, both of 345 Keith Dr., Colorado Springs, Colo. 80916

[21] Appl. No.: 166,756

[22] Filed: Jul. 7, 1980

[51] Int. Cl.³ .............................................. B07B 1/02
[52] U.S. Cl. .................................. 209/236; 209/374; 209/417; 209/258; 222/189; 222/564
[58] Field of Search ............... 209/236, 258, 282, 283, 209/357, 358, 374, 417; 222/189, 564

[56] References Cited

U.S. PATENT DOCUMENTS

| 1,068,900 | 7/1913 | Herd | 210/470 |
|---|---|---|---|
| 1,226,722 | 5/1917 | Sullivan | 141/268 |
| 1,314,467 | 8/1919 | Dachsel | 209/258 |
| 1,345,058 | 6/1920 | Beckman | 209/258 |
| 1,471,361 | 10/1923 | Sarles | 209/283 X |
| 1,476,693 | 12/1923 | Crosskill | 209/374 X |
| 1,593,312 | 7/1926 | Shappell | 209/358 X |
| 2,642,992 | 6/1953 | Winn | 209/240 |
| 2,674,375 | 4/1954 | Clay | 209/251 |
| 2,866,552 | 12/1958 | Richman | 209/255 |
| 3,118,575 | 1/1964 | McCauley | 222/564 X |
| 4,099,654 | 7/1978 | Antolino | 209/417 X |

Primary Examiner—William A. Cuchlinski, Jr.
Attorney, Agent, or Firm—Hugh H. Drake

[57] ABSTRACT

A flour sifter has an upright cylinder within the interior of which a screen is disposed generally transversely to cooperate with an agitator movable over the screen to effect the sifting of flour therethrough. Affixed across the lower end of the cylinder is a first plate which includes a circumferentially-spaced first series of openings successively separated by respectively interposed first panels. A second plate, juxtaposed with the first plate, is movable about an axis extending centrally of the cylinder and includes a circumferentially-spaced second series of openings again successively separated by respectively interposed second panels. Those second openings are alignable with the first openings upon movement of the second plate to one position and are alignable with the first panels upon movement of the second plate to another position. Included on each of the panels of the uppermost one of the plates is a smooth surface that slants upwardly from one opening in that one plate to a peak from which the surface then slants back downwardly toward the next opening.

6 Claims, 3 Drawing Figures

FLOUR SIFTER

The present invention pertains to a flour sifter. More particularly, it relates to an assembly which may include a conventional sifting mechanism but which also includes additional features of utility.

Most persons are familiar with the long-used form of flour sifter in which a screen is disposed generally transversely across the interior of an upright cylinder open at both ends. An agitator, turned manually by an externally protruding handle, is movable over the screen to effect the sifting of the flour therethrough. That rather simple device has taken many forms, with further development leading even to such complex assemblies as that shown, for example, in U.S. Pat. No. 2,642,922-Winn.

One problem attendant to use of the aforementioned simple version is the inability of such a sifter to retain the sifted material until it subsequently is desired to discharge the batch all at once. A related problem with that simple version is the tendency of a portion of the flour to cling to the screen from which it thereafter can be jarred loose as the sifter is set down upon the countertop or elsewhere following its initial use. Of course, that tends to make a mess that later has to be cleaned. Unless rather promptly cleaned, the powdery characteristic of the flour is such that it may inadvertently be scattered around so as to enhance the mess.

An early solution to such problems appears in U.S. Pat. No. 1,345,058-Beckman. There, a butterfly valve assembly is included in the lower portion of the overall upright cylinder. One difficulty with this approach is that, in order to allow room for swinging of the butterfly valve, the height of the cylinder must be substantially increased.

An even earlier approach is that shown in U.S. Pat. No. 1,314,467-Dachsel. A swingout valve plate underlies the cylinder, and there is included in that additional assembly an opening associated with another swingable valve member so as to permit discharge of the flour from a smaller opening than that which exists at the bottom of the sifter when the total mechanism is swung to its open position. Besides additional complexity in terms of structure, the opened valve assembly contributes to awkardness in using the assembly and can undesirably serve in itself to scatter flour previously lodged thereon. When employed in its closed condition, the assembly allows flour to be retained in the sifter to the side of the valve opening.

Also recognizing the problem of undesired scattering of flour during use of the sifter was Richman in U.S. Pat. No. 2,866,552. He teaches the use of the addition of a flexible funnel attached at its top to the bottom of the sifter and foldable to one side in order to close the bottom of the sifter. One disadvantage is that his resultant overall assembly has to be much higher. In addition, the collapsible funnel assembly poses its own problems with respect to subsequent cleaning.

It may be observed that most of the prior art so far discussed is directed to use of the basic agitator and screen mechanism of the simple sifter first mentioned. A different mode of agitation, employing a flat screen together with an oscillating flat agitator, is shown in U.S. Pat. No. 2,674,375-Clay. The apparatus there disclosed also separates the assembly into two parts so that one may contain the flour to be sifted and the other may be employed as a canister. One of those parts includes an openable valve in its bottom wall for the purpose of discharging sifted flour. As in Dachsel, however, flour undesirably may build up in the region surrounding the valve opening.

In liquid-dispensing apparatus, it has been known to slant lower, discharging surfaces in order to cause a liquid better to be dispensed either through a limited-area valve as in U.S. Pat. No. 4,099,654-Antolino or through lateral filter elements as in U.S. Pat. No. 1,068,900-Herd. Of course, the filtering elements in Herd would interfere with discharge of a powdery material such as sifted flour, and the limited discharge area of the central valve in a utinsel like that of Antolino would not only, if adapted to a flour sifter, prevent ready dumping of the entire sifted contents but also would employ a valve mechanism which would be at least difficult to clean in the environment of handling flour.

A very effective valve assembly for use at one end of a tubular container to dispense a pulverized material is the shutter arrangement commonly found on containers for grated cheese. A pair of juxtaposed discs each contain a series of openings in the form of annular segments, with one of the discs being movable relative to the other so as either to align or mis-align the respective openings and thereby permit either closing for containment or opening for dispensing. A similar shutter assembly is shown in the funnel-shaped measuring device of U.S. Pat. No. 1,226,722-Sullivan. It might appear to be advantageous to substitute a shutter arrangement of this form in place of the butterfly valve, for example, in the Beckman patent above discussed. Yet, that approach presents problems in common with other prior approaches as already discussed. That is, flour tends undesirably to build up and be retained upon the closed portions of the upper one of such discs.

It is, accordingly, a general object of the present invention to provide a new and improved flour sifter which takes advantage of the best of the features of the prior art while yet avoiding the difficulties encountered therewith.

Another object of the present invention is to provide a new and improved flour sifter of such character and yet which is simple and easy to manufacture and includes only a small total number of parts.

A flour sifter constructed in accordance with the present invention includes an upright cylinder, a screen disposed generally transversely across the interior of the cylinder and intermediate its length and an agitator disposed immediately above and movable over a screen to effect the sifting of the flour therethrough. Affixed across the lower end of the cylinder is a first plate that includes means defining a circumferentially-spaced first series of openings successively separated by respectively interposed first panels. A second plate, juxtaposed with the first plate, is movable about an axis extending centrally of the cylinder and includes means defining a circumferentially-spaced second series of openings successively separated by respectively interposed second panels. The second openings are alignable with the first openings upon movement of the second plate to one position and are alignable with the first panels upon movement of the second plate to another position. Finally, at least one smooth surface is defined on each of the panels of the uppermost one of the plates to slant upwardly from the adjacent margin of a corresponding opening in the one plate and toward the adjacent margin of the next successive opening in the one plate beyond the upper terminus of that surface.

The features of the present invention which are believed to be patentable are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

Figure 1:
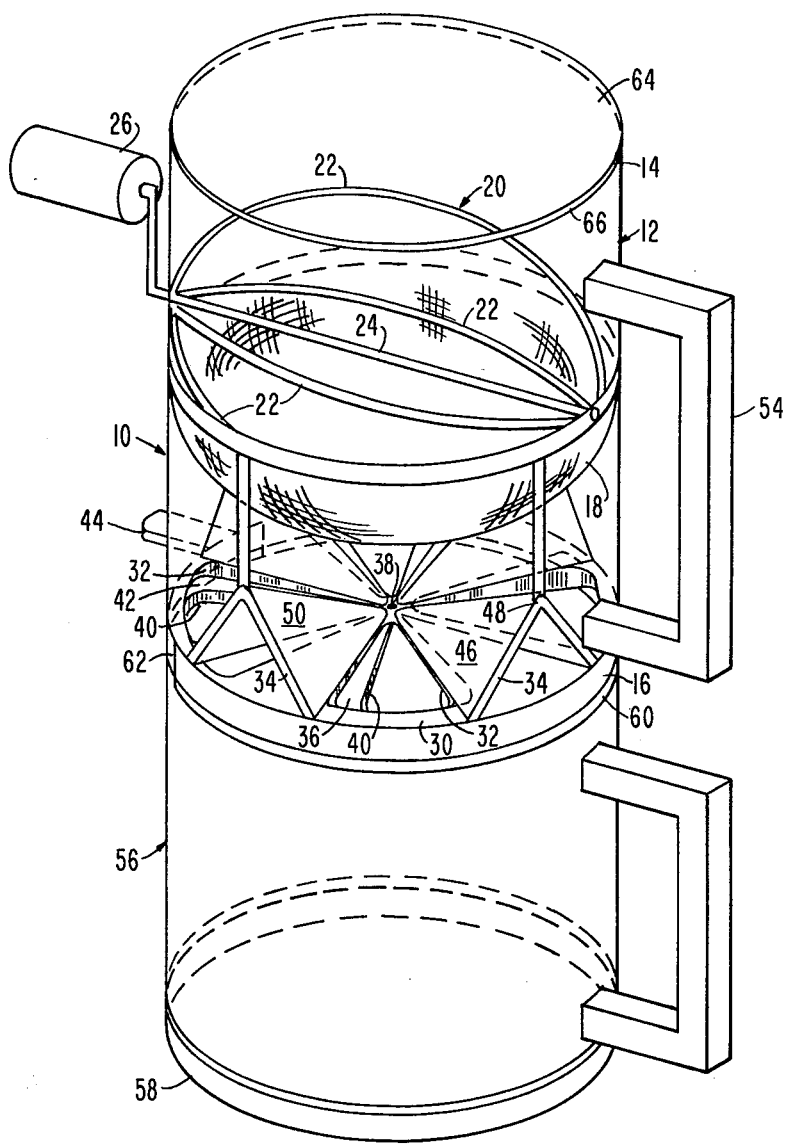
FIG. 1 is an isometric view of a flour sifter in accordance with invention.
Figure 2:
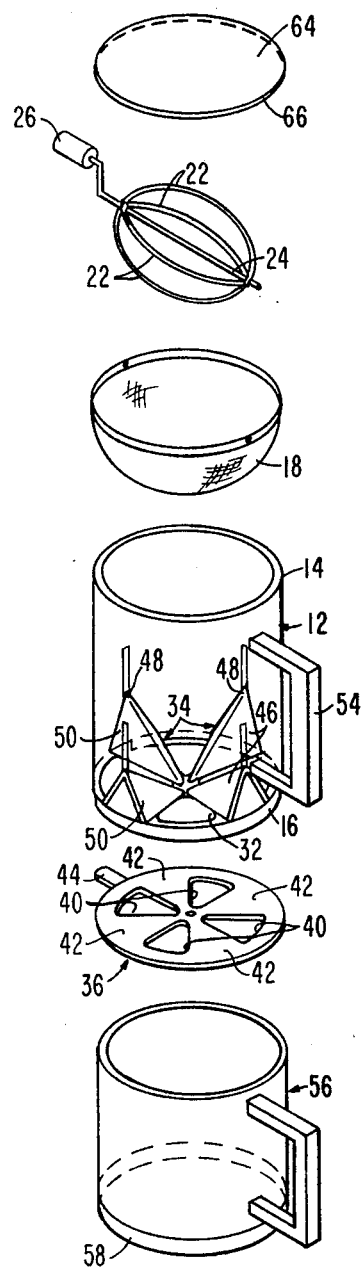
FIG. 2 is an exploded isometric view thereof.
Figure 3:
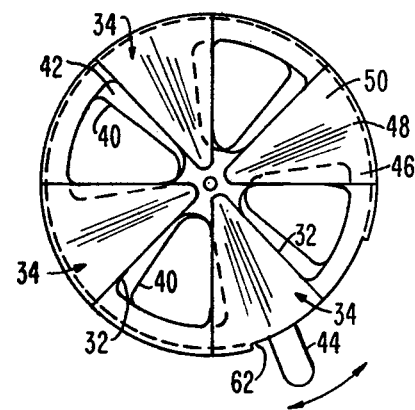
FIG. 3 is a top plan view of an internal subassembly.

A flour sifter 10 includes an upright cylinder 12 open at its upper-end margin 14 and having a lower-end margin 16. Disposed generally transversely across the interior of cylinder 12 and intermediate its length is a downwardly-concave semi-hemispherical screen 18. An agitator 20 is located immediately above screen 18 and includes a series of arcuate arms 22 mounted at their respective opposite ends on a spindle 24 and each movable over screen 18 to effect the sifting of flour therethrough that first has been placed on top of the screen through the upper end of cylinder 12. For turning agitator 20, spindle 24 projects through the wall of cylinder 12 and terminates in a handle 26 which is manipulated by the user to rotate the agitator.

Integrally affixed across lower-end margin 16 of cylinder 12 is a plate 30. Included in plate 30 is a circumferentially-spaced series of openings 32 successively separated by respectively interposed panels 34. Juxtaposed with plate 30 and immediately therebelow is another plate 36 secured to plate 30 at its center by a rivet 38, so as to be movable about an axis, on which rivet 38 is located, that extends centrally of cylinder 12. Plate 36 includes its own circumferentially-spaced series of openings 40 separated respectively by interposed panels 42. Openings 40 are alignable with openings 32 upon movement of plate 36 to one position and, on the other hand, are alignable with panels 34 upon movement of plate 36 to another position. Projecting laterally outward from beneath cylinder 12 is a handle 44, in this case integral with plate 36, which permits such movement of that plate.

All of openings 32 and 40 individually are in the shape of a segment of an annulus. Thus, manipulation of handle 44 to move plate 36 relative to plate 30 results in a valving-type closing or opening as desired at the bottom of cylinder 12 and for the purpose of dispensing flour that has been sifted.

Each of panels 34 of uppermost plate 30 is formed to define a smooth surface 46 which slants upwardly from the adjacent margin of a corresponding one of openings 32 in plate 30 toward the adjacent margin of the next successive one of openings 32 beyond the upper terminus or peak 48 of that surface. Beyond peak 48, the panel surface then slants back downwardly, as at 50, to that adjacent margin of the next successive one of openings 32. Slanting surfaces 46 and 50 together constitute a baffle, located between the corresponding adjacent openings in uppermost plate 30, which insures that the sifted flour is readily dispensed in and through openings 30 instead of being retained upon the top of plate 30 between openings 32.

As illustrated in the preferred form, each such baffle assembly, between the openings in the uppermost plate, thus is shaped like a pup tent. In one alternative, however, one surface, such as surface 46, may continue to a peak which is aligned over the margin of the next successive opening and from which peak there may be, at the extreme, a downwardly-directed vertical web in place of a reciprocal downwardly-slanting surface 50. In any case, the purpose of the baffling is to prevent the build-up of sifted flour between the openings in the uppermost plate.

Desirably, of course, cylinder 12 includes an outwardly-projected handle 54 to enable the user to grasp the sifting unit in one hand while turning handle 26 with the other hand. Also preferably included in the combination is a canister 56 open at its top and closed by a bottom wall 58. Moreover, lower-end margin 16 of cylinder 12 is shaped to define a recess 60 which is seatable atop the upper end of canister 56. A gap 62 is formed into recess 60 to accept the outward projection of handle 54 and thereby permit ready manipulation by the user.

Finally, the combination desirably also includes a lid 64. In that connection, lid 64 includes a downwardly-projecting lip 66 selectively engageable, as desired, over either the upper end of cylinder 12 or the upper end of canister 56.

In another alternative to the illustrated structure, it is the uppermost one of plates 30 and 36 which is mounted so as to be movable, while the lower plate is stationary. In that case, therefore, the baffle assembly composed of slanting surfaces 46 and/or 50 is formed as a part of the movable one of the plates.

Whatever the particular form, it will thus be apparent that a selectively openable closure is afforded at the bottom of the basic sifter. The actual sifter mechanism may be of the conventional type illustrated or that of a different variety as discussed in the introduction. In any case, the user is enabled to close the discharge outlet from the sifter either while performing that operation or afterward and before the sifter is placed aside from the site of operation. It is this latter capability which assists in avoiding the scattering of remnants of the flour onto undesired locations. At the same time, the selectively openable closure mechanism, by reason of the inclusion of the baffle assemblies, assures against retention within or on the closure assembly of portions of the sifted flour.

It also will be observed that there are essentially a minimum of component parts. The assembly lends itself well to a maximum of the use of molded plastics in formation of the comparatively few components that are included.

While a particular embodiment of the invention has been shown and described, and various alternatives and modifications have been disclosed, it will be obvious to those skilled in the art that changes and modifications may be made without departing from the invention in its broader aspects. Therefore, the aim in the appended claims is to cover all such changes and modifications as fall within the true spirit and scope of the invention.

We claim:

1. A flour sifter comprising:

an upright cylinder;

a screen disposed generally transversely across the interior of said cylinder intermediate the length thereof;

an agitator disposed immediately above and movable over said screen to effect the sifting of flour therethrough;

a first plate affixed across the lower end of said cylinder and including means defining a circumferentially-spaced first series of openings successively separated by respectively interposed first panels;

a second plate juxtaposed with said first plate, movable about an axis extending centrally of said cylinder and including means defining a circumferentially-spaced second series of openings successively separated by respectively interposed second panels, said second openings being alignable with said first openings upon movement of said second plate to one position and being alignable with said first panels upon movement of said second plate to another position;

and means included on each of the panels of the uppermost one of said plates defining a smooth surface which slants upwardly from the adjacent margin of a corresponding opening in said one plate toward the adjacent margin of the next successive opening in said one plate beyond the upper terminus of said surface.

2. A flour sifter as defined in claim 1 in which said surface slants downwardly from said terminus toward said adjacent margin of said next successive opening.

3. A flour sifter as defined in claim 1 or 2 in which said openings individually are in the shape of a segment of an annulus.

4. A flour sifter as defined in claim 1 or 2 in which the uppermost one of said plates is said first plate.

5. A flour sifter as defined in claim 1 or 2 which further includes a canister open at its upper end, and the lower end margin of said cylinder defines a recess seatable atop the upper end of said canister, means defining a gap in said recess, and a handle projecting from said second plate through said gap.

6. A flour sifter as defined in claim 5 which further includes a lid selectably closeable with both the upper end of said canister and the upper end of said cylinder.

* * * * *